(12) United States Patent
Doetsch et al.

(10) Patent No.: US 6,954,483 B2
(45) Date of Patent: Oct. 11, 2005

(54) METHOD AND DEVICE FOR SYNCHRONIZING MOBILE RADIO RECEIVERS IN A MOBILE RADIO SYSTEM

(75) Inventors: Markus Doetsch, Schliern (CH); Tideya Kella, München (DE); Peter Schmidt, Ellerstadt (DE); Peter Jung, Otterberg (DE); Jörg Plechinger, München (DE); Michael Schneider, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/047,001

(22) Filed: Jan. 16, 2002

(65) Prior Publication Data

US 2002/0141480 A1 Oct. 3, 2002

Related U.S. Application Data

(63) Continuation of application No. PCT/DE00/02272, filed on Jul. 12, 2000.

(30) Foreign Application Priority Data

Jul. 16, 1999 (DE) .......................................... 199 33 542

(51) Int. Cl.[7] ................................................. H04B 1/69
(52) U.S. Cl. ........................ 375/136; 375/148; 370/335; 370/342
(58) Field of Search ................................ 375/136, 148, 375/142, 143, 130, 343, 156, 140, 147, 149, 150, 347; 370/206, 335, 342, 441, 522, 320

(56) References Cited

U.S. PATENT DOCUMENTS

| | | |
|---|---|---|
| 5,271,034 A | 12/1993 | Abaunza |
| 5,648,991 A | 7/1997 | Namekata et al. |
| 5,691,974 A | 11/1997 | Zehavi et al. |
| 5,805,648 A | 9/1998 | Sutton |
| 5,974,038 A * | 10/1999 | Shou et al. .................. 370/335 |

(Continued)

FOREIGN PATENT DOCUMENTS

| | | |
|---|---|---|
| DE | 196 15 257 A1 | 10/1996 |
| EP | 0 748 118 A2 | 12/1996 |
| EP | 0 892 528 A2 | 1/1999 |
| EP | 0 901 235 A2 | 3/1999 |
| WO | WO 98/59427 | 12/1998 |

OTHER PUBLICATIONS

Robert A. Piety: "Intrabuilding Data Transmission Using Power–Line Wiring", Hewlett–Packard Journal, May 1987, pp. 35–40, XP–000984462.

*Primary Examiner*—Emmanuel Bayard
(74) *Attorney, Agent, or Firm*—Laurence A. Greenberg; Werner H. Stemer; Ralph E. Locher

(57) ABSTRACT

Mobile radio receivers in a mobile radio system are synchronized. A first synchronization channel is provided, which has a first frequency and via which a code which is known to all the mobile radio receivers and to all the base stations of the mobile radio system is transmitted with a signal. The transmission from a base station to a mobile radio receiver delays the signal by an unknown time period and the first frequency is displaced by the transmission to a second frequency. The method includes a correlation and sampling of the received signal, digital filtering of the correlated and sampled signal, squaring of the filtered signal, determination of the maximum signal level of the squared signal, estimation of the unknown time period with the maximum signal level, despreading of the received signal with the known code, taking into account the just-estimated time period, and fine-tuning of the second frequency to the first frequency.

12 Claims, 1 Drawing Sheet

U.S. PATENT DOCUMENTS

| | | | |
|---|---|---|---|
| 5,991,279 A | * | 11/1999 | Haugli et al. ............... 370/311 |
| 6,067,314 A | * | 5/2000 | Azuma ....................... 375/147 |
| 6,104,748 A | * | 8/2000 | Kaku ......................... 375/235 |
| 6,192,088 B1 | * | 2/2001 | Aman et al. ................ 375/326 |
| 6,278,699 B1 | * | 8/2001 | Atarius ....................... 370/324 |
| 6,289,038 B1 | * | 9/2001 | Park ........................... 375/131 |
| 6,289,041 B1 | * | 9/2001 | Krasner ..................... 375/152 |
| 6,301,316 B1 | * | 10/2001 | Uchida et al. .............. 375/347 |
| 6,404,758 B1 | * | 6/2002 | Wang ......................... 370/342 |
| 6,414,985 B1 | * | 7/2002 | Furukawa et al. .......... 375/142 |
| 6,430,209 B1 | * | 8/2002 | Shigyo et al. .............. 375/130 |
| 6,487,260 B1 | * | 11/2002 | Schweickert et al. ....... 375/343 |
| 6,510,387 B2 | * | 1/2003 | Fuchs et al. ................ 701/213 |
| 6,563,807 B1 | * | 5/2003 | Kim et al. .................. 370/331 |

* cited by examiner

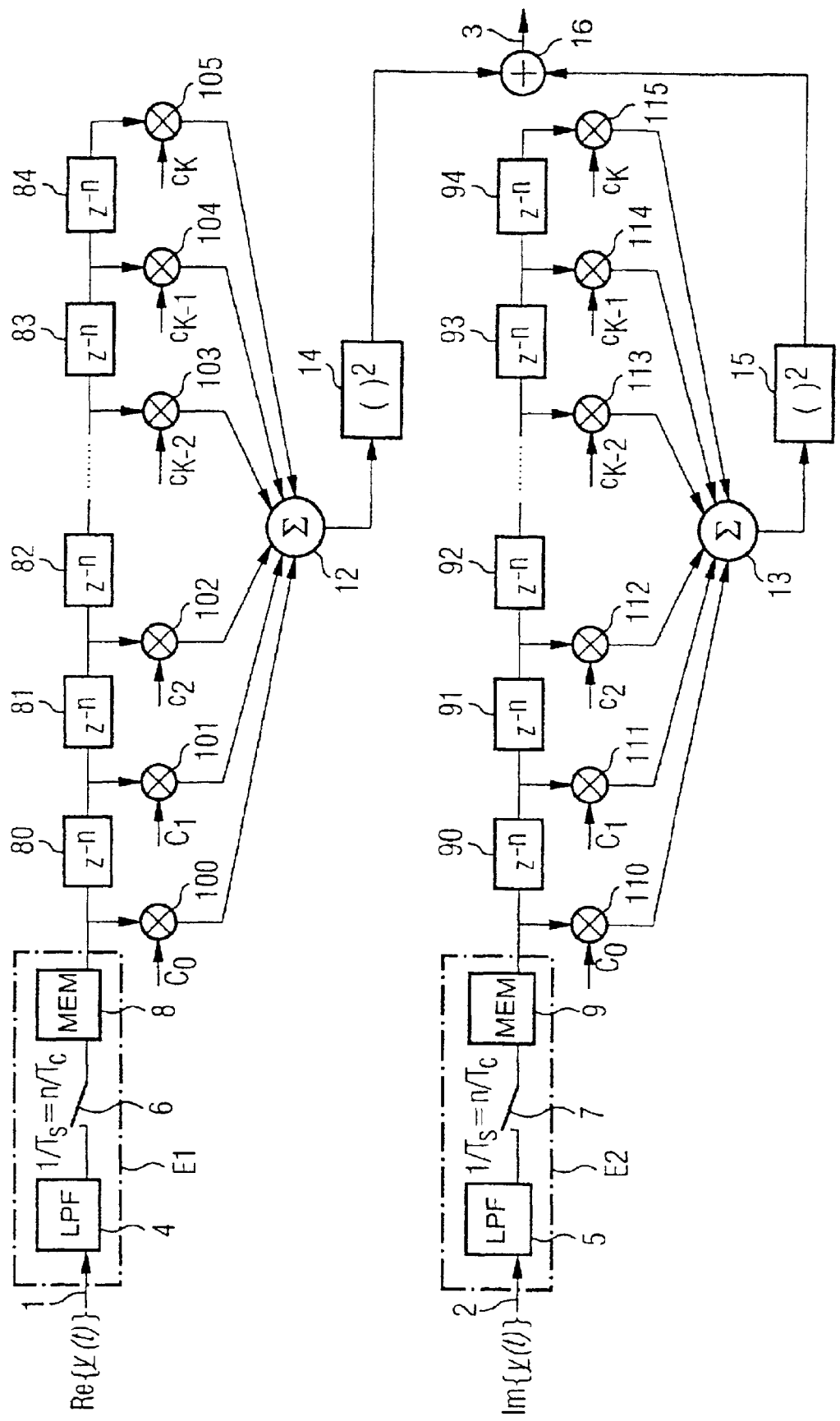

METHOD AND DEVICE FOR SYNCHRONIZING MOBILE RADIO RECEIVERS IN A MOBILE RADIO SYSTEM

CROSS-REFERENCE TO RELATED APPLICATION

This application is a continuation of copending International Application No. PCT/DE00/02272, filed Jul. 12, 2000, which designated the United States.

BACKGROUND OF THE INVENTION

Field of the Invention

The invention lies in the communications technology field and relates, more specifically, to a method for synchronizing mobile radio receivers in a mobile radio system and to a device for synchronizing mobile radio receivers in a mobile radio system.

In mobile radio systems, a mobile radio receiver who wishes to "sign on" to the mobile radio system must be synchronized. Synchronization here comprises the acquisition of a synchronization signal and then the tracking of the signal, and of possible further signals of a link.

In mobile radio systems operating according to the GSM (Global System for Mobile Communications) standard, a so-called broadcast control channel (BCCH) is used for the acquisition process. The broadcast control channel (BCCH) transmits signals unidirectionally from each base station to mobile radio receivers. Important information for a mobile radio receiver, for example information relating to the power control, the minimum reception field strength and the frequency position of the BCCH, is broadcast in a broadcast control channel. In addition, a frequency control channel (FCCH) for frequency correction, which has a frequency correction burst, and a synchronization channel (SCH) for performing synchronization are transmitted in the BCCH. The SCH thereby has a so-called synchronization burst which allows the mobile radio receiver to be synchronized.

When a GSM mobile radio receiver is switched on, all the possible carrier frequencies are searched for the BCCH. Then, the frequency correction burst is used to select a suitable frequency and the synchronization burst is evaluated in order to set a correct time reference.

Mobile radio systems that are based on the code division multiple access method (CDMA), such as the UMTS (Universal Mobile Telecommunication System), have a primary synchronization channel (PSCH) which, like the BCCH in the case of the GSM systems, is transmitted unidirectionally from each base station to mobile radio receivers. The frequency of the PSCH is the same for all the base stations of the mobile radio system. When a mobile radio receiver is switched on, it firstly searches for the PSCH in order to carry out synchronization of time and frequency. In the process, an initially excessively coarse setting of the frequency of the PSCH in the mobile radio receiver is later fine-tuned by means of appropriate algorithms for frequency correction.

A signal s(t), which is transmitted over the PSCH by a base station, has the following form:

$$s(t) = \sum_n c_n \cdot g(t - n \cdot T_c) \cdot \exp(j \cdot \omega_0 \cdot t) = c(t - T_d) \cdot \exp(j \cdot \omega_0 \cdot t)$$

where g(t) is a pulse shape function (for example the square wave signal), $T_c$ is the period of a chip, $c_n$ are the chips of the PSCH and $\omega_0 = 2\pi f_0$ is the carrier frequency of the PSCH. The term $T_d$ represents a delay time which is unknown to the receiver and which results, inter alia, from the propagation time from the base station to a mobile radio receiver.

The chips $c_n$ are usually encoded in binary fashion by the values +1 and −1 in band-spreading technology:

$$c_n = 2 \cdot b_n - 1$$

wherein $b_n$ represents a series of 1/0 bits. Other chip alphabets, derived for example from BTQ transformation, are perfectly possible.

A total of 256 binary chips $c_n$ are transmitted with the PSCH. The chips are thereby known to each mobile radio receiver and to each base station and they constitute a uniquely defined sequence of bits for identifying the PSCH.

During the transmission over the PSCH, the signal s(t) is distorted by noise and interference. These occur, for example, as a result of a secondary synchronization channel (SSCH) and other adjacent channels.

A demodulated receive signal r(t), on which the transmit signal s(t) is based, then has, in a mobile radio receiver, the following form:

$$r(t) = c(t - T_d) \cdot \exp(j \cdot \Delta\omega \cdot t + \phi) + n(t)$$

The function n(t) represents the faults which occur owing to noise and interference. The frequency $\Delta\omega$ is the deviation in the mobile radio receiver from the transmit signal frequency $\omega_0$. The following applies for the frequency $\omega_d$ used for demodulation: $\omega_d = \omega_0 + \Delta\omega$.

The correct detection of the chips from the receive signal r(t), i.e. the synchronization and the precise setting of the demodulation frequency $\omega_d$ to the transmit signal frequency $\omega_0$ in order to correctly synchronize the mobile radio receiver, is problematic. To be precise, the unknown delay time $T_d$ and a demodulation frequency $\omega_d$ which is approximated as well as possible to the transmit signal frequency $\omega_0$ are necessary for the detection.

SUMMARY OF THE INVENTION

It is accordingly an object of the invention to provide a method and a device for synchronizing mobile radio receivers in a mobile radio system, which overcomes the above-mentioned disadvantages of the heretofore-known devices and methods of this general type and which is based on the code division multiplex method CDMA.

With the foregoing and other objects in view there is provided, in accordance with the invention, a method of synchronizing mobile radio receivers in a mobile radio system, wherein a first synchronization channel with a first frequency is provided for transmitting a signal with a code that is known to the mobile radio receivers and to base stations of the mobile radio system, and wherein a transmission from a base station to a mobile radio receiver delays the signal by an unknown time period and the first frequency is shifted by the transmission to a second frequency. The method comprises the following steps:

a) splitting a received signal into a real part signal and an imaginary part signal;
b) sampling the real part signal and the imaginary part signal to form sampled signals;
c) digitally filtering each sampled signal to correlate the sampled signal to the known code and to form filtered signals;
d) squaring each filtered signal to form squared signals;
e) determining a maximum signal level from the squared signals;

f) estimating the unknown time period with the maximum signal level determined in the determining step;

g) despreading the received signal with the known code and taking into account the time period estimated in the estimating step; and h) fine-tuning the second frequency to the first frequency.

In other words, the objects are achieved according to the invention by means of a method for synchronizing mobile radio receivers in a mobile radio system, a first synchronization channel being provided, which has a first frequency and via which a code which is known to all the mobile radio receivers and to all the base stations of the mobile radio system is transmitted by means of a signal, the transmission from a base station to a mobile radio receiver delaying the signal by an unknown time period and the first frequency being displaced by the transmission to a second frequency. The method steps include splitting of the received signal into real and imaginary signal elements, sampling of each signal by splitting, digital filtering of each sampled signal in order to correlate it to the known code, squaring of each filtered signal, determination of the maximum signal level from both squared signals, estimation of the unknown time period with the maximum signal level, despreading of the received signal with the known code taking into account the estimated time period, and fine-tuning the second frequency to the first frequency.

This method can advantageously be used both for the acquisition and the tracking and it expands the methods known from GSM systems. In particular, this method can be applied in multimode mobile radio receivers, that is to say mobile radio receivers which can be used in mobile radio systems which are based on different standards, for example GSM and UMTS.

Preferably, in c) sampled values of each signal are delayed by the digital filtering by up to (2K+1) clock cycles. Given a long delay of the sampled values, the unknown time period by which a signal which is to be transmitted is delayed during the transmission from the base station to the mobile radio receiver can advantageously be estimated very precisely. Here, the longest delay should lie in the region of the longest possible delay of a transmission signal. In particular, the differently delayed sampled values are multiplied by 2(K+1) coefficients and summed. The 2(K+1) coefficients have here preferably (K+1) pairs of identical coefficients.

In one preferred embodiment, the code which is transmitted with the signal has a sequence of 256 chips, the 256 chips uniquely characterizing the first synchronization channel. The received signal is sampled here in particular with a sampling rate wherein two sampled values are taken per chip of the code.

With the above and other objects in view there is also provided, in accordance with the invention, a device for synchronizing mobile radio receivers in a mobile radio system having a first synchronization channel for transmitting a signal with a code that is known to all the mobile radio receivers and to all base stations of the mobile radio system, comprising:

input signal processing units in a mobile radio receiver for processing a received signal including a real part signal and an imaginary part signal;

said input signal processing units generating sampled values;

a plurality of delay circuits connected in series with said input signal processing units for receiving an input signal and outputting an output signal, said delay circuits receiving the sampled values and correlating the real part signal and the imaginary part signal with the known code;

multipliers connected to receive the input signal and the output signal of each delay circuit and multiplying a supplied signal with a coefficient;

first adders connected to receive an output signal from each said multiplier and each outputting a summed signal;

squaring elements each having an input connected to receive the summed signal from a respective said first adder and outputting a squared signal; and a second adder connected to receive the squared signals from said squaring elements.

In other words, the invention also relates to a device for synchronizing mobile radio receivers in a mobile radio system wherein a first synchronization channel is provided, via which a code which is known to all the mobile radio receivers and to all the base stations of the mobile radio system is transmitted by means of a signal, input signal processing units for the real part and imaginary part of a received signal being provided in the mobile radio receiver, said real and imaginary parts being supplied with real and imaginary signal elements and generating sampled values which are fed to delay circuits which are each connected in series, for correlation of the real and imaginary signal elements with the known code, the input signal and the output signal of each delay circuit being fed in each case to a multiplier which multiplies a signal fed to it by a coefficient, and the output signals of the multipliers being fed to first adders, downstream of which squaring elements are connected, and output signals of the squaring elements being fed to a second adder.

Input signal processing preferably comprises an analog low-pass filter, downstream of which a sampler and a memory for storing the sampled values are connected.

A number (K+1) different coefficients are preferably provided. In particular, 2(K+1) multipliers are provided, two multipliers multiplying in each case signals fed to them by one of the (K+1) different coefficients. In each case two multipliers thereby multiply, in particular, the input signal or the output signal of one of the delay circuits with one of the (K+1) different coefficients.

Other features which are considered as characteristic for the invention are set forth in the appended claims.

Although the invention is illustrated and described herein as embodied in a method and device for synchronizing mobile radio receivers in a mobile radio system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic block diagram of an exemplary embodiment of a device for carrying out the method according to the invention.

DESCRIPTION OF THE PREFERRED EMBODIMENTS

Referring now to the sole FIGURE of the drawing in detail, the device illustrated therein represents an incoherent, digital filter for determining the delay $T_d$ which is unknown due to the transmission. The incoherent filter has the following transfer function:

$$h(t)=c^*(K\cdot T_c-t),$$

where $$0\leq t\leq K\cdot T_c).$$

K corresponds here to the number of coefficients which are used in the digital filter for filtering.

In order to determine the delay $T_d$, the complex, received signal in the mobile radio receiver is first split into a real part 1 and an imaginary part 2. The real part 1 and the imaginary part 2 are then processed in parallel by respective identical input signal processors.

The real part 1 and the imaginary part 2 are each fed to an analog low-pass filter 4 and 5, respectively.

Connected downstream of the low-pass filter 4 and 5, respectively, is, in each case, a sampler 6 and 7, respectively, which samples the output signal of the low-pass filter 4 and 5, respectively, with a sampling rate $T_s$. Here, $T_c=2\cdot T_s$ is selected as the sampling rate, i.e. two sampled values are taken per period of a chip of the receive signal. Each chip is thus wherein by two sampled values. For more precise results of the method to be carried out, more than two sampled values can be taken per chip, but the subsequent expenditure on processing the sampled values then increases. In each case a memory 8 and 9, respectively, is arranged downstream of the samplers 6 and 7.

The low-pass-filtered and sampled real part and imaginary part are designated below respectively by $\text{Re}_k$ and $\text{Im}_k$. The index k thereby designates a sampled value.

Each sampled value is then delayed by up to (2K+1) clock cycles and multiplied by each of the K coefficients of the filter. The results of the multiplications are then summed, squared and fed to an estimation circuit which detects the strongest output signal. The strongest output signal is then fed to a frequency fine-tuner which fine-tunes the frequency used for demodulation to the transmit signal frequency.

The sampled values $\text{Re}_k$ and $\text{Im}_k$ are then fed to a delay circuit which has a multiplicity of delay elements 80, 81, 82, 83 to 84 and 90, 91, 92, 93 to 94 which are connected in series. Each series has 2K+1 delay elements here.

An input signal of the respective delay element is fed in parallel to a multiplier 100 and 110, 101 and 111, 102 and 112, 103 and 113, 104 and 114, respectively, upstream of the input of each of the 2K+1 delay elements 80, 81, 82, 83, 94 and 90, 91, 92, 93, 94, respectively. In addition, the output signal of the last delay element 84 and 94, respectively, is fed to a multiplier 105 and 115, respectively. In this way, 2K+2 multipliers—two multipliers per filter coefficient—are present, in each case two multipliers 100 and 101, 110 and 111 to 104 and 105, 114 and 115, respectively, multiplying one sampled value—one of these delayed by a clock cycle—by the same coefficient $c_0$ to $c_K$ of the filter.

The output signals of the multipliers 100 to 105 and 110 to 115 are fed to a first adder 12 and 13, respectively.

The first adder 12 is followed by a squaring element 14, in the signal flow direction. The second adder 13 is followed by a squaring element 15. The squaring elements 14 and 15 square the output signals of the adders 12 and 13, respectively.

The output signal of the squaring element 14 and the output signal of the squaring element 15 are fed to a second adder 16, which outputs an output signal 3.

The output signal 3 of the second adder 16, which corresponds to a sequence of filtered sampled values of the received signal, is then fed to an estimation circuit for determining the strongest signal per sequence.

The output signal 3 has the following profile here:

$$y(t)=r(t)*h(t).$$

For the time variable t the following applies: $t=0, T_s, 2T_s$,

The strongest output signal occurs here during the delay time which is closest to the unknown delay time $T_d$. In this way, the unknown delay time $T_d$ can easily be determined in the estimation circuit.

Given knowledge of the unknown delay time $T_d$, the receive signal r(t) can be despread and processed for fine-tuning the demodulation frequency $\omega_d$ to the transmit signal frequency $\omega_0$.

The despread signal e(t) has the following profile:

$$e(t)=r(t+T_d)\cdot c^*(t)=$$
$$(c(t)\cdot\exp(j\cdot(\Delta\omega\cdot(t+T_d)+\phi))+$$
$$n(t+T_d))\cdot c^*(t)=$$
$$|c(t)|^2\cdot\exp(j\cdot(\Delta\omega\cdot t+\phi_0))+$$
$$n(t+T_d)\cdot c^*(t)=$$
$$|c(t)|^2\cdot\exp(j\cdot(\Delta\omega\cdot t+\phi_0))+n'(t)$$

After the despread signal e(t) has been sampled with the sampling rate $T_s$, the following sequence is obtained:

$$e_n=A_n\cdot\exp(j\cdot(n\cdot\Delta\omega\cdot T_s+\phi_0))+n'_n$$

If $\Delta\omega=2\pi f'$ and $T_b=N\,T_s$ are inserted, the following is obtained for the sequence:

$$e_n = A_n \cdot e^{j\varphi_0} \cdot \exp\left(j\cdot 2\pi\cdot f'\cdot T_b\cdot \frac{n}{N}\right)+n'_n$$

This sequence can easily be further processed with algorithms for frequency correction in order to determine the frequency deviation f'.

We claim:

1. A method of synchronizing mobile CDMA radio receivers in a cellular CDMA mobile radio system, wherein a first synchronization channel with a first frequency is provided for transmitting a synchronization signal with a code that is known to the mobile radio receivers and to base stations of the mobile radio system, and wherein a transmission from a base station to a mobile radio receiver delays the synchronization signal by an unknown time period and the first frequency is shifted by the transmission to a second frequency, the method which comprises the following steps:

splitting the received synchronization signal into a real part signal and an imaginary part signal;

sampling the real part signal and the imaginary part signal to form sampled signals;

digitally filtering each sampled signal to correlate the sampled signal to the known code and to form filtered signals;

squaring each filtered signal to form squared signals;

determining a maximum signal level from the squared signals;

estimating the unknown time period with the maximum signal level determined in the determining step;

despreading the received synchronization signal with the known code and taking into account the time period estimated in the estimating step;

determining a frequency deviation between the first frequency and the second frequency based on the despread received synchronization signal; and fine-tuning the second frequency to the first frequency based in part on the despread received synchronization signal.

2. The method according to claim 1, wherein the filtering step comprises delaying the sampled values of each signal by up to (2K+1) clock cycles, where K is a number of coefficients of a digital filter executing the filtering step.

3. The method according to claim 2, which comprises multiplying the differently delayed sampled values by 2(K+1) coefficients and then summing.

4. The method according to claim 3, wherein the 2(K+1) coefficients have (K+1) pairs of identical coefficients.

5. The method according to claim 1, which comprises defining the code to be transmitted with the synchronization signal to have a sequence of 256 chips uniquely characterizing the first synchronization channel.

6. The method according to claim 5, which comprises sampling each signal obtained by splitting with a sampling rate wherein two sampled values are taken per chip of the code.

7. A device for synchronizing mobile CDMA radio receivers using the method according to claim 1 in a mobile radio system having a first synchronization channel for transmitting a synchronization signal with a code that is known to all the mobile radio receivers and to all base stations of the mobile radio system, comprising:

input signal processing units in a mobile radio receiver for processing the received synchronization signal including a real part signal and an imaginary part signal;

said input signal processing units generating sampled values;

a plurality of delay circuits connected in series with said input signal processing units for receiving an input signal and outputting an output signal, said delay circuits receiving the sampled values and correlating the real part signal and the imaginary part signal with the known code;

multipliers connected to receive the input signal and the output signal of each delay circuit and multiplying a supplied signal with a coefficient;

a first adder connected to receive an output signal from each said multiplier, said first adder outputting a summed signal;

squaring elements each having an input connected to receive the summed signal from a respective said first adder and outputting a squared signal; and a second adder connected to receive the squared signals from said squaring elements.

8. The device according to claim 7, wherein each said input signal processing unit has an analog low-pass filter, a sampler, and a memory.

9. The device according to claim 7, wherein a number of different coefficients is (K+1).

10. The device according to claim 9, wherein 2(K+1) multipliers are provided, and two multipliers in each case multiply signals received thereby by one of the (K+1) different coefficients.

11. The device according to claim 10, wherein in each case two multipliers are connected to multiply one of the input signal and the output signal of one of said delay circuits by one of the (K+1) different coefficients.

12. The method according to claim 1, wherein the first synchronization channel is a primary synchronization channel PSCH stipulated in a UMTS standard.

* * * * *